Patented June 19, 1928.

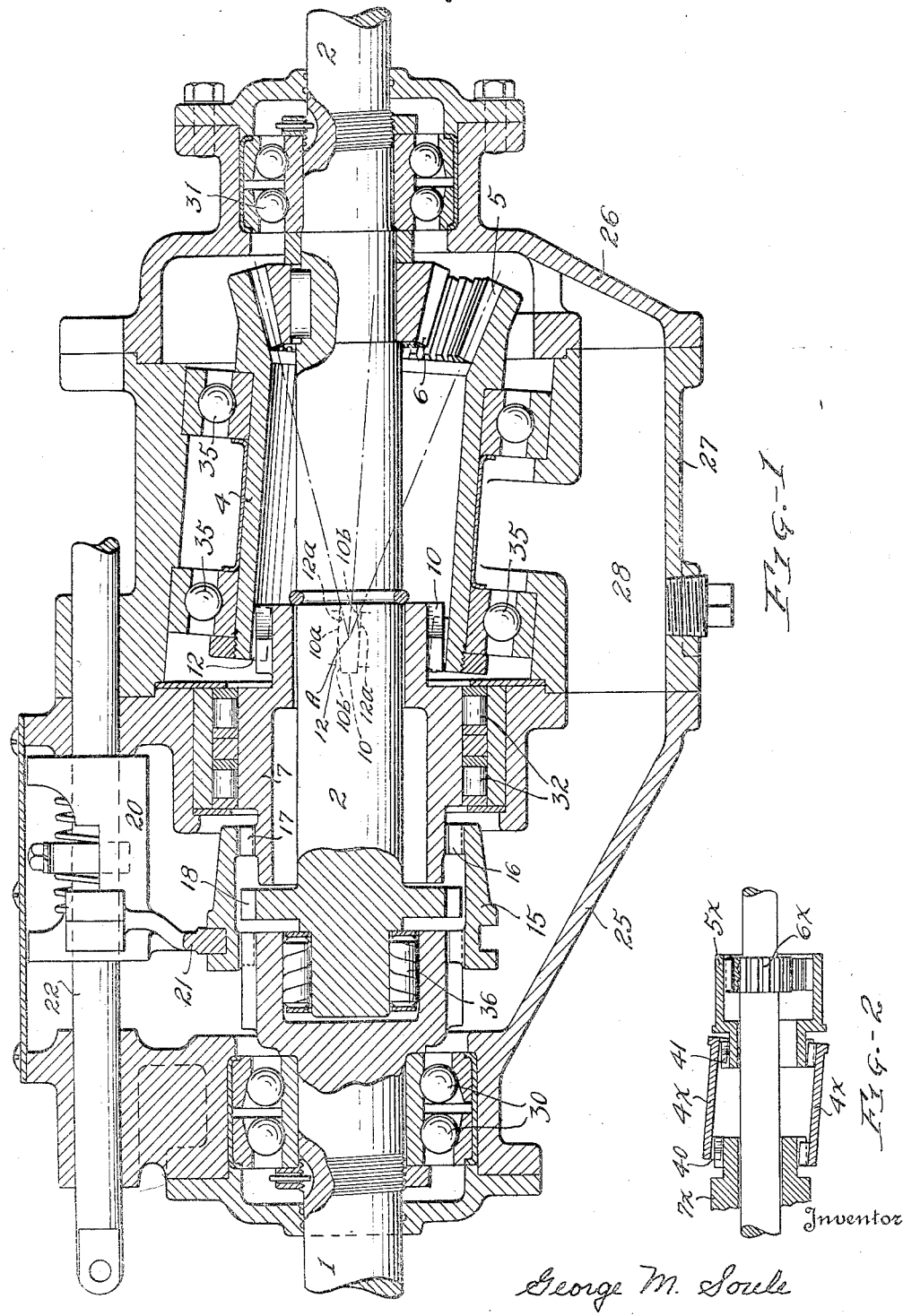

1,674,072

UNITED STATES PATENT OFFICE.

GEORGE M. SOULE, OF SOUTH EUCLID, OHIO, ASSIGNOR TO AUTOMOTIVE PATENT HOLDING COMPANY, OF CLEVELAND, OHIO, A CORPORATION OF DELAWARE.

TRANSMISSION GEARING.

Application filed September 4, 1926. Serial No. 133,524.

The object of this invention is to provide a simplified form of gearing operable to connect two shafts or rotatable members for different relative speeds. A specific object is to provide a compact and simple gearing for obtaining direct drive and a single different speed relation between two rotatable members. A further object is to provide an auxiliary change speed gearing having relatively few parts and which may be easily operated to change from one speed to another.

The gearing employs internal-external gears which are found to transmit power more quietly than ordinary spur gears and which, by reason of one being in surrounding relation to the other, may be made large enough to transmit considerable power without occupying a relatively great amount of space. One of the gears is hollow and axially offset with reference to the other and one of the shafts extends through the hollow gear, this arrangement allowing the shafts to substantially abut each other and permitting the employment of a very simple clutch arrangement for connecting the shafts either through the gears or directly together. An advantage of the construction is that the direct drive connection which is the most used, is along a straight line, wherefore maximum driving efficiency is obtained in this speed.

The drawing illustrates the preferred embodiment, and the various features of the invention, are more clearly set forth in the following detailed description. The essential novel characteristics appear in the claims.

Fig. 1 is a central longitudinal sectional view of one form of gearing and Fig. 2 is a similar fragmentary view of a modified form.

In the drawings (Fig. 1) one of the members to be connected, which for convenience, will be hereinafter termed the drive shaft is indicated at 1, and the driven shaft at 2. An inclined hollow gear 4 surrounds the driven shaft and has internal bevel gear teeth 5 meshing with bevel external teeth 6 on a pinion rigid with this shaft. The axes of the two shafts coincide and the axis of the hollow gear intersects the shaft axis, for illustration at the point A, which point determines the bevel of both sets of teeth.

In order that a simple sleeve clutch may be used to connect the shaft 1 either directly to the shaft 2 or through the intermediacy of the gears there is provided a tubular member 7 coaxial with the shafts and having a universal dental connection with the gear 4 comprising sets of teeth 10 and 12 on the sleeve and the hub of the gear 4 respectively. The location of this connection is determined by the point A as will presently appear.

Each tooth of one of the sets (the teeth 10 as shown) has its working faces beveled each way from a central point on such tooth, the angle of the bevel being determined by the declination of the gear 4 to the shaft. By this means all the internal teeth, except for the usual clearance, may be in contact with all the external teeth at all times. These relations will be best understood with reference to the dotted line representation of a horizontally disposed tooth 10 which, as shown, has its diagonally opposite beveled surfaces 10$^a$ substantially in full contact with the parallel surfaces 12$^a$ of the adjacent teeth 12. On the opposite side of the sleeve 7 this particular tooth would contact with the teeth 12 along the beveled surfaces 10$^b$. All the other teeth 10 are at this time, in sliding contact with teeth 12, along the thick portion of these teeth 10. By such means, power may be transmitted almost as efficiently as by an ordinary splined connection, depending of course on the declination of the gear to the sleeve since this would not be true of a comparatively steep angle of declination.

Power may be selectively transmitted from the shaft 1 through the hollow gear, by reason of teeth 16 of a clutch sleeve 15 splined onto the member 1 and engaging teeth 17 on the member 7, or directly through the shaft 2 by reason of the teeth 16 engaging teeth 18 rigid with the shaft 2.

A suitable shifting arrangement for the sleeve 15 may comprise a slidably mounted member 20 having a shifting fork 21 engaging the sleeve and arranged to be moved by a bar 22 mounted in the casing. The bar may be similarly formed on each end to connect with a suitable control, link or lever, such arrangement allowing the use of substantially the same connecting linkage whether the gearing, as shown, serves as an under drive or an over drive.

The gearing may be suitably housed in a casing such as illustrated, comprising end sections 25 and 26 and an intermediate section 27. These parts inter-communicate to allow the free passage of oil, contained in a well 28, at the bottom, to all parts of the gearing and the various bearings.

The bearing supports as shown comprise double thrust ball bearings 30 and 31 in the casing sections 25 and 26 for the shafts 1 and 2 respectively, rollers 32 for supporting the member 7 and longitudinally spaced rolling bearings 35 for the hub of the gear member 4. If desired the bearings 35 could be modified to better take the longitudinal thrust from the bevel gears and an additional intermediate support for the shaft 2 might be provided between the member 7 and this shaft. As shown, the inner end of the shaft 2 has a support close to the bearings 20 by reason of a pilot bearing 36 within the enlarged inner end of the shaft 1.

In Fig. 2 the inclined hollow member $4^x$ has a universal dental connection at each end, that indicated at 40 connecting the member to a clutch member $7^x$ and the other, namely 41, to an internal gear carrying member $5^x$ having teeth meshing with an external pinion $6^x$. The gear member $5^x$ thus takes the place of the bevel gear 5 in Fig. 1. Such a construction is not as light and simple as the embodiment shown in Fig. 1 but it has this advantage namely that the parallel internal and external gear teeth are more easily manufactured than the bevel gear teeth.

As above mentioned the gearing shown is adapted for a single reduction (or increase) speed auxiliary transmission. It is to be understood however that the novel principles above set forth may be variously embodied in a more complete mechanism for attaining additional speed - changes while keeping within the scope of the invention.

I claim:

1. A gearing comprising a pair of aligned shafts, clutch means for connecting the shafts directly together for synchronous rotation, and means for connecting the shafts for relative rotation comprising an annular member, and means to connect the same to one of the shafts in one to one ratio, the axis of the annular member being in permanently fixed offset relation to the axis of this shaft, said annular member having an internal-external geared connection with the other shaft.

2. A change speed gearing comprising two axially aligned members arranged to be coupled directly together, and gear means, one element of which is in surrounding relation to one of the members and rotatable on an axis in fixed inclined relation thereto, for connecting the members for relative rotation.

3. Two shafts in axial alignment, a hollow member rotatable on a fixed inclined axis with relation to the shafts and in surrounding relation to one of the shafts, said hollow member having a geared connection therewith, and means for connecting the shafts either directly or through the hollow member.

4. In a gearing, a shaft, a hollow gear surrounding the shaft with its axis in fixed inclined relation to the shaft and in geared relation thereto, the gear elements affording a difference in speed between the hollow gear and shaft, another shaft in axial alignment with the first named shaft, a connection between the two shafts, and another connection between the shafts through the hollow member.

5. Two shafts and a sleeve surrounding one of them, means to connect the shafts for a given speed, and means including a hollow gear having a driving connection with the sleeve and a permanent bevel gear connection with one of the shafts for connecting the shafts at a different speed.

6. In a change speed gearing, means for connecting a pair of axially aligned shafts in such a manner that one rotates faster than the other, comprising a hollow member in surrouding relation to one of the shafts, said member being in fixed axially inclined relation thereto and having an internal-external geared connection therewith and means for connecting the shafts for a different speed.

7. In a gearing, a pair of shafts to be connected in different speed relations, means for connecting the shafts for direct drive, and means including a hollow gear the axis of which intersects the axis of one shaft, said gear having a universal joint positioned adjacent the point of intersection and a bevel gear connection with the same shaft, for connecting the shafts at a different speed.

8. In a gearing, a shaft, a sleeve surrounding the same, a hollow member having internal teeth drivingly rigid therewith, a pinion rigid with the shaft and meshing with said internal teeth, a direct drive connection between the sleeve and hollow member, another shaft, and clutch means on such other shaft arranged to selectively couple this shaft to the sleeve or to said first named shaft.

9. In a gearing, a casing, two shafts extending thereinto, means to couple the shafts together at a given speed, and means including a hollow gear rotatably mounted on a fixed axis with relation to the casing and in surrounding and geared relation to one of the shafts, said axis being inclined with reference to this shaft, for connecting the shafts at another speed.

10. In a gearing, a casing, a pair of shafts supported thereby, a hollow rotatable gear supported rigidly by the casing, said gear having internal bevel teeth at one end, an external pinion on one of the shafts meshing with the said teeth, and means including a universal joint connection at the other end of said hollow gear for connecting said shafts through said gear and pinion.

11. In combination, a pair of shafts, means for connecting the shafts together at a given speed, a hollow member surrounding one of the shafts and axially inclined relative thereto, a geared connection between this shaft and member, a sleeve surrounding and in axial alignment with said last named shaft, a dental universal driving connection between the gear member and said sleeve, and means for coupling the other shaft to the sleeve for connecting the shafts at a different speed.

12. In a gearing, a pair of rotatable members to be connected in different speed relations, a sleeve surrounding one of the members, external teeth carried thereby having each of their working faces beveled in two planes, an axially inclined hollow member in surrounding relation to one of the rotatable members and having an internal-external gear connection therewith at one end, a series of internal teeth having their working faces parallel and in direct connection with the said beveled teeth whereby in effect a universal joint connection is had between the gear and sleeve, and means connecting the said rotatable members directly together or through said gear.

13. In a gearing, two axially aligned shafts, means for coupling the shafts together for a given speed relation and a plurality of hollow sleeve-like members in surrounding relation to one of the shafts, one having an internal-external gear connection with the driven shaft, means including a dental universal joint for connecting two of the sleeves together to enable one to be inclined with reference to the other, one member being coaxial with the shafts, and means for connecting the latter member with the driving shaft.

14. In a gearing, two rotatable members, means for connecting the members in such a manner that one drives the other at a given speed, and means for connecting the members for another speed comprising a sleeve surrounding one of the members and in constant inclination thereto, said sleeve having an internal-external gear driving connection therewith, and a device for establishing a driving connection between the sleeve and the other rotatable member.

15. In a gearing, a pair of axially aligned shafts, means for establishing an interruptable direct driving connection between the shafts, and means for connecting the shafts for relative rotation comprising, an annular member on a permanently fixed axis offset from the shafts and having a one to one ratio driving connection with one shaft and an internal-external geared connection with the other, one of said latter two connections being interruptable.

16. In a gearing, two axially fixed aligned shafts, means for connecting them for rotation at the same speed, and means for connecting the shafts for relative speed, comprising an external gear drivingly rigid with one of the shafts, and an annular member on a permanently fixed axis and having internal teeth adapted to mesh with said gear, said annular member having a one to one ratio driving connection with the other shaft.

In testimony whereof, I hereunto affix my signature.

GEORGE M. SOULE.